United States Patent [19]

Kowal et al.

[11] Patent Number: 4,606,584
[45] Date of Patent: Aug. 19, 1986

[54] SPRING BUSHING ACTIVATED BRAKE PORPORTIONER

[75] Inventors: Raymond J. Kowal, West Bloomfield; Arthur G. Sabat, Warren; Patrick Salva, Sterling Heights, all of Mich.

[73] Assignee: Chrysler Corporation, Highland Park, Mich.

[21] Appl. No.: 685,875

[22] Filed: Dec. 24, 1984

[51] Int. Cl.4 ............................................. B60T 8/22
[52] U.S. Cl. .................................. 303/22 R; 303/6 C
[58] Field of Search ............... 188/195; 303/6 R, 6 C, 303/22 R, 23 R, 56

[56] References Cited

U.S. PATENT DOCUMENTS

| 2,987,346 | 6/1961 | Wrigley | 303/22 R X |
| 3,257,153 | 6/1966 | Strifler | 303/22 R |
| 3,285,673 | 11/1966 | Dobrikin | 303/22 R |
| 3,701,616 | 10/1972 | Kawai | 303/22 R |
| 3,709,568 | 1/1973 | Miyake et al. | 303/22 R |
| 3,954,306 | 5/1976 | Hess | 303/22 R |
| 3,975,062 | 8/1976 | Giordano et al. | 303/22 R |
| 4,060,283 | 11/1977 | Demido et al. | 303/22 R X |

*Primary Examiner*—Duane A. Reger
*Attorney, Agent, or Firm*—Kenneth H. MacLean, Jr.

[57] ABSTRACT

An improved braking system particularly for a vehicle, such as a van, subject to relatively large differences in loading, including a force responsive proportioning valve inserted between a master brake cylinder and the rear brakes for increasing the rear braking effort relative to the front as the load on the vehicle increases. A position follower device operably connected to the force input of the proportioning valve is responsive to angular movements of the end portion of the rear leaf spring which transmits an increasing input force to the valve as the vehicle load increases.

4 Claims, 6 Drawing Figures

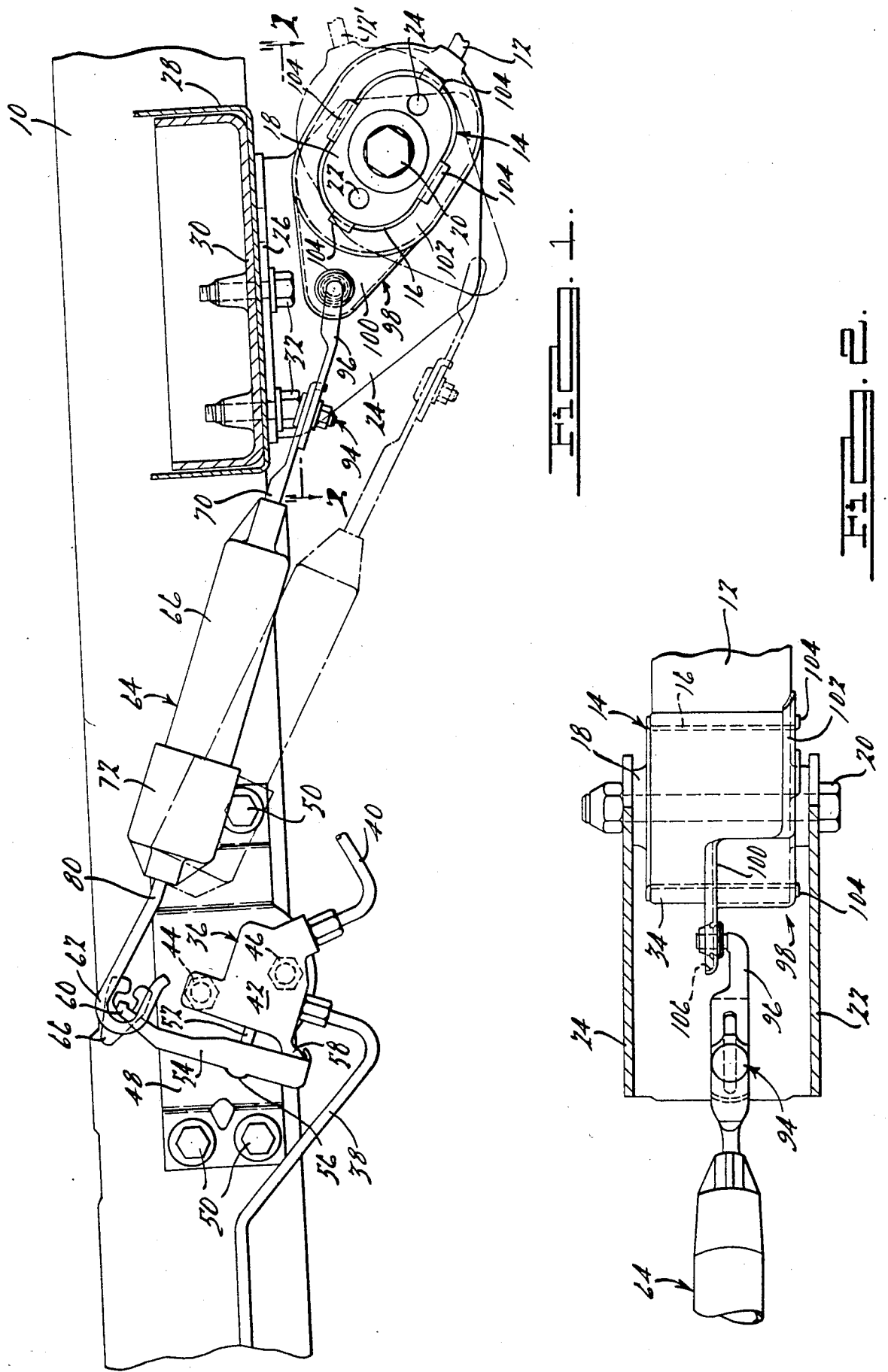

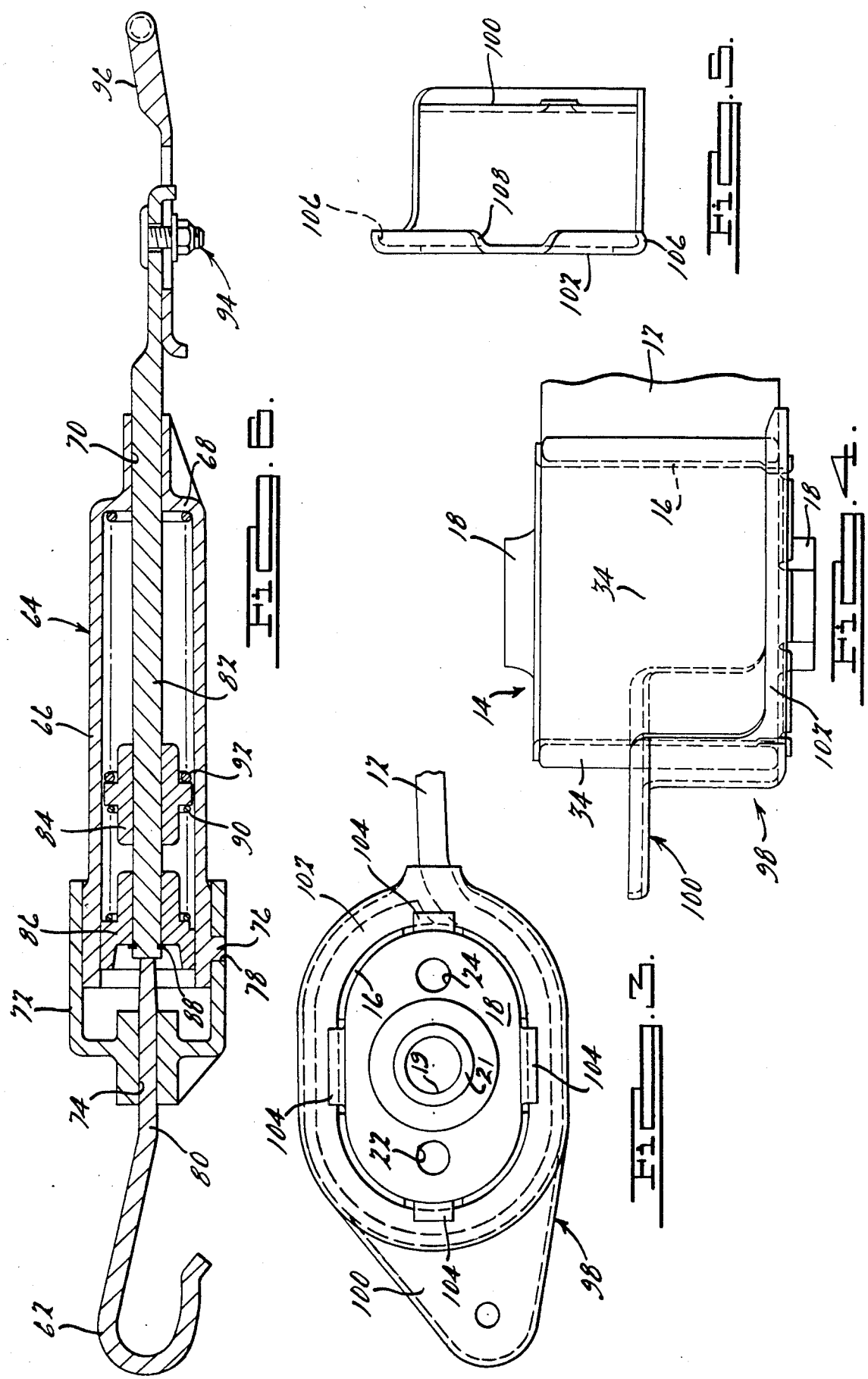

SPRING BUSHING ACTIVATED BRAKE PORPORTIONER

BACKGROUND OF THE INVENTION

This application relates to an improved brake system for a vehicle, particularly one which is subject to significant variable loading, such as a van. The brake system utilizes a proportioning valve between the master cylinder and the rear brakes. Its purpose is to increase the effect of rear braking as the vehicle is loaded. Conversely, the valve decreases the rear braking effect when the vehicle load decreases.

Prior use of a rear brake proportioning valve include the 1984–1985 Chrysler Corporation built T-115 van and wagon, namely the Plymouth "Voyager" and the Dodge "Minivan" and "Caravan." In these vehicles, a proportioning valve is attached to a body cross member slightly forward of the rear axle and slightly to the left of the vehicle center line. A lever assembly is attached to the rear axle rightward of the proportioning valve and projects upward from the axle. An elongated tension-type spring extends between the lever assembly and the proportioning valve. When the vehicle is lightly loaded, the position of the lever end of the tension spring is only slightly higher than the proportioning valve end. As vehicle load increases, the valve end moves further downward with respect to the lever end and, thus, extends the spring resulting in an increased force applied to the proportioning valve. Resultantly, the valve directs increased fluid pressure to the rear brakes for greater rear braking.

The aforedescribed brake system operates satisfactorily. However, the location of the valve, spring and lever assembly is somewhat inconvenient since the spare tire is stored immediately to the rear of these components. It would improve the accessibility of the spare tire if these brake components were placed elsewhere.

It is important to locate the proportioning valve where it is protected. It has been found that a desirable location for the valve is just forward of the rear wheel and up near the forward end portion of the rear leaf-type suspension spring. This is where the forward end of the leaf spring is connected to the vehicle. In this location, the proportioning valve can be supported by the same longitudinal body of chassis member which also supports the spring end. In the position, the input force means for the valve extends directly to a position follower sensing means which is operably connected to the leaf spring end.

The degree of vehicle load in the subject application is sensed by a position follower device which is operably connected to the forward end portion of the rear suspension spring. As the vehicle load increases, the spring's end portion is pivoted through an arc as the vehicle body and spring ends move downward with respect to the spring mid-portion. A projecting arm of the position follower is attached to one end of a spring loaded and axially yieldable connector. The other end of the connector is attached to the input control of the proportioning valve which is force responsive. As the follower pivots due to loading of the vehicle, the force input to the proportioning valve is increased. Resultantly, an increased brake pressure is directed to the rear brakes.

Therefore, an object of the invention is to provide an improved vehicle brake proportioning system which utilizes a load sensing input means operating directly in response to movements of a vehicle rear suspension spring for controlling a proportioning valve.

A further object of the invention is to provide an improved vehicle brake proportioning system, including a rear suspension spring position follower directly engaging the end portion of the rear suspension spring, pivoting with the spring end as the spring responds to increased vehicle loading and transmitting load forces via an axially yieldable and spring biased connector to a proportioning valve.

Other objects and advantages of the subject invention will be readily apparent from a reading of the following detailed description of the preferred embodiment, which is shown in the following drawings.

IN THE DRAWINGS

FIG. 1 is a partial elevational view of a vehicle showing the subject brake proportioning system located just forward of the rear suspension spring.

FIG. 2 is a fragmentary sectioned view of the spring position follower device taken along section line 2—2 in FIG. 1 and looking in the direction of the arrows.

FIG. 3 is an enlarged elevational view of the spring end portion and the spring position follower shown in FIG. 1.

FIGS. 4 and 5 are enlarged planar and end views of the spring position follower shown in FIG. 1.

FIG. 6 is an enlarged and sectional view of the axially yieldable connector shown in FIG. 1.

DETAILED DESCRIPTION OF THE PREFERRED EMBODIMENT

In FIG. 1, a partial side view of the vehicle structure 10 is shown at a location just forward of the rear wheel assembly. A forward end portion 12 of the leaf-type rear suspension spring is visible to the right in FIG. 1. The end portion 12 encircles a bushing member 14, best shown in FIGS. 2-5. The bushing 14 includes a generally tubular metal outer housing or member 16 with an elliptical cross section seen in FIGS. 1 and 3. The member 16 tightly surrounds a hard rubber core 18 which carries a central aperture or opening 19 therethrough for acceptance of a fastener type support member 20. Specifically, aperture 19 is formed by a cylindrical metal member 21 tightly surrounded by the rubber core 18. Two smaller apertures 22, 24 are molded to extend through the rubber core 18 and define space to permit slight "flow" of the rubber material caused by confining the core 18 within the member 16 since the hard rubber material is essentially incompressible. Without "flow" space for the rubber, the core 18 could not be tightly inserted into the elliptically shaped housing 16. The fastener 20 which supports the spring as best shown in FIG. 2 extends through central opening 19 in core 18 between bracket support portions 22 and 24. A mid-portion 26 of the bracket support is secured to vehicle structure members 28 and 30 which extend laterally from the longitudinal member or structure 10. Fasteners 32 secure the central portion 26 of the bracket support to this vehicle structure.

As previously explained, the tubular bushing assembly 14 supports the forward end portion 12 of the rear suspension spring. More specifically, the end of the leaf spring 12 is formed into a curved end portion 34 configured to encircle the peripheral outer portion of the bushing member 14 seen in FIGS. 2 and 3. When the mid-portion of the leaf spring 12 flexes or moves in the vertical direction, particularly in response to changes in vehicle loading, the bushing assembly 14 pivots about fastener 20. The pivotal motion is shown in FIG. 1 in which the numeral 12 represents a lightly loaded vehicle position whereas numeral 12' represents a relatively heavily loaded position. The solid outline portion of bushing 14 in FIG. 1 corresponds to the light load position whereas the broken outline portion of the bushing 14 represents the more heavily loaded position.

As previously mentioned, the subject vehicle braking system is conventional in that a master cylinder assembly generates a brake pressure by input of a driver. However, it also includes another brake control device, namely, a proportioning valve assembly 36 as shown in FIG. 1. Proportioning valve assemblies, per se, have been previously used in vehicle brake systems. The typical proportioning valve is a force responsive device which regulates and directs the hydraulic pressure generated by the vehicle's master cylinder control to the rear wheel brakes. In this application, the force input to the proportioning valve is generated in response to changes in vehicle loading, and particularly, to the rear portion of the vehicle which is reflected by the flexure of the rear suspension spring. When a vehicle is only lightly loaded, handling improves when a greater share of the braking is accomplished by the front brakes. When heavily loaded, handling improves when more braking is accomplished by the rear brakes.

In FIG. 1, a brake fluid conduit 38 is shown which extends from a forwardly located master cylinder assembly of the vehicle (not shown). The vehicle operator, by depressing the brake pedal, generates pressurization of the hydraulic fluid of the brake system. This pressure is directed by other brake lines (not shown) to the front brake components. The same hydraulic pressure is directed through the conduit 38 to the brake proportioning valve 36. A second conduit (behind conduit 38 and, thus, not visible) extends from the master cylinder control to the proportioning valve 36. Conduit 38 is for the left side rear wheel brakes and the other conduit is for the right side rear brakes. The brake proportioning valve 36 regulates the fluid pressure and directs the regulated pressure to the left rear brake component through conduit 40. A similar conduit (not visible) extends from the brake proportioning valve 36 at a location immediately behind the conduit 40 and to the right rear brake components of the vehicle. An equal hydraulic pressure is generated by valve 36 and applied to the left and the right rear brake components.

In the present application illustrated in the drawings, the proportioning valve 36 has its body 42 attached by fasteners 44, 46 to a bracket assembly 48. The bracket 48 is attached to the longitudinally extending structure 10 by fasteners 50. The valve 36 includes internal components operably acted on by a rod actuator 52 which reciprocates axially into and out of the body 42. The exterior end of actuator 52 is engaged by a lever member 54 which contacts the rod 52 at a raised seat portion 56 formed in lever 54. The lever 54 pivots about its lower end edge portion on a projection portion 58 of housing 42. The upper free end 60 of lever 54 is engaged by a hooked end portion 62 of an elongated yieldable spring assembly 64. Specifically, the end portion 62 directly engages a grommet-like member 66 inserted on the end 60 of the lever 54.

The elongated and axially yieldable assembly 64 is best shown examined with reference to FIG. 6. It includes an elongated tubular housing 66 with one end portion 68 formed into a reduced diameter bore guide 70. The other end of the housing 66 is engaged by a generally cup-shaped member 72 which also has a reduced diameter bore 74 therethrough. The members 66 and 72 are telescopically assembled and fixed in a desired axial and rotational position by a tab or pin 76 operably engaged with a bore 78. An extension 80 of the hooked end portion 62 of the assembly 64 extends through bore 74 and is axially fixed to the cap 72 (preferably by molding therewith). An elongated member 82 extends through a guide bore 70 in the end 68 of housing 66 and also through spaced spring retainer members 84 and 86. A fastener 88 engages the leftward end portion of member 82 to prevent leftward movement between member 86 and member 82. The retainers 84 and 86 axially support a relatively light compression spring 90 therebetween. The spring retainer 84 also supports one end of a second compression spring 92 which is somewhat stiffer than spring 90. The opposite end of spring 92 is retained by the end portion 68 of housing 66. This arrangement permits elongation of assembly 64 in a yieldable manner characterized by outward movement of member 82 from housing 66 corresponding first to compression of spring 90 and to compression of spring 92 subsequently once the spring 90 is in a more collapsed position.

As previously explained, the hooked left end of the assembly 64 is operably connected to the end of lever 54 of the brake proportioning valve, as shown in FIG. 1. The rightward end of member 82 is adjustably attached by a fastener 94 which acts in a slot of a connector member 96. Member 96 is attached to a projecting portion of a spring follower member 98. The follower 98 reflects the angular position and movements of the bushing and, thus, the spring end. Member 98 is designed to overlay one end of the bushing assembly 14 as best illustrated in FIGS. 1-4. Its outer edge also overlays the end portion 34 of spring 12. When the spring 12 flexes from its lightly loaded position (solid lines) to a more heavily loaded position (broken lines), the resultant angular movement of the bushing assembly 14 and end 34 produces a corresponding movement or arc of a projecting arm portion 100 as will be more readily understandable from the detailed description hereinafter.

In the preferred embodiment, the bushing and spring follower member 98 is a stamped metal device with a generally elliptically shaped body portion 102 to conform to the elliptical configuration of the outer edge of spring portion 34. The outer edge portions of body portion 102 are curved so as to snugly fit over the end portion 34 of the spring 12. The inner edge of the body 102 defines an elliptical opening which conforms to the end shape of metal housing 16. The metal housing 16 is provided with four projecting tabs 104 which, before assembly, are co-planar with the surface of the housing 16 to allow the body portion 102 to fit against the end of the bushing assembly 14. When assembled, as shown in the drawings, the tabs are folded over the body 102. Thus, the tabs 104 secure the follower member 98 firmly against the end of the bushing assembly 14 and the spring end 34. By this arrangement, assembly 14, position follower 98 and the spring end 34 pivot together about the axis of fastener 20.

Now it can be readily understood that angular movements of the spring end 34 caused by variations in vehicle loading produce pivotal movements of the arm 100 through a substantial distance. As shown in FIG. 1, the portion 96 of the extendable assembly 64 is attached in a pivotal manner to the arm 100. Increased loading of the vehicle causes the projection 100 to pivot counterclockwise through a substantial angular distance, thus elongating the yieldable assembly 64. This elongation corresponds to compression of the springs 90 and 92 therein and increases the force applied by the hooked end 60 to the valve proportioning lever 54. The resultant force on the end of lever 54 is transmitted through the valve actuator rod 52 to the interior of the proportioning valve. Consequently, the valve 36 transmits increased pressure of fluid from the master cylinder to the rear brake components. Conversely, when the vehicle is only lightly loaded, the arm 100 is pivoted clockwise in FIG. 1 which causes the assembly 64 to axially contract. This decreases the force on the actuating pin 52. Resultantly, the valve 36 directs a decreased fluid pressure level to the rear brake components.

Although only one preferred embodiment of the subject invention has been illustrated and described in detail, it should be apparent that modifications to this particular embodiment can be readily made without falling outside the scope of the invention which is described in the following claims.

We claim:

1. In a vehicle having a brake and a suspension system including a longitudinally oriented rear leaf spring between sprung and unsprung portions of the vehicle, a selectively activated brake fluid pressurizer, front and rear wheel brakes, an input force responsive brake fluid pressure proportioning valve between the selective fluid pressurizer and the rear brakes to regulate the transmission of fluid brake pressure thereto and an improved vehicle load sensor and force generator operably connected thereto comprising:

the rear leaf spring having a forwardly oriented end portion directly secured to the sprung portion of the vehicle in a manner permitting only pivotal angulations thereof as the vehicle sprung portion moves with respect to the unsprung portion caused by changes in vehicle loading;

following means overlying the pivotally mounted forward end portion of the rear leaf spring for following and exactly duplicating the angular movements thereof produced by relative movements between sprung and unsprung portions caused by changes in vehicle loading;

edge portions of the following means overlyingly engaging portions of the spring end portion so that the pivotal movements of the end portion exactly produces corresponding pivotal movements of the following means;

an outwardly extending arm portion of the following means movable therewith through a significant amplitude in response to pivoting of the spring end portion;

a yieldable, axially extendable connector means between the proportioning valve and the arm of the following means whereby movement of the arm corresponding to movements of the end portion of the spring caused by changes in loading extends and contracts the connector means to generate resultant forces on the force input of the proportioning valve to appropriately increase and decrease the brake fluid pressure transmitted to the rear brakes as the vehicle load increases and decreases, respectively.

2. A vehicle with a brake proportioning system to automatically increase and decrease braking effects of the rear brakes in relation to the front brakes in response to changes in vehicle loading:

the vehicle having a rear suspension between sprung and unsprung portions with a longitudinally extending leaf spring having a forward end portion pivotally mounted to the vehicle sprung portion and pivotal through an angular range determined by vehicle loading;

a proportioning valve means adjacent the end portion of the rear spring and having fluid inlet means to receive pressurized brake fluid generated by actions of a vehicle operator and fluid outlet means to transmit regulated fluid pressure to the rear brakes;

the proportioning valve being controlled by an input force thereto whereby a low input control force transmits a relatively low fluid pressure through the outlet means and a relatively higher input control force transmits an increased fluid pressure through the valve outlet means to the rear brakes;

a spring position following and duplicating device operatively connected to and overlying the pivotally mounted end portion of the spring for movement therewith through the angular pivoting thereof produced by vehicle load changes, the device having an arm projecting thereof movable through a substantial movement corresponding to pivoting of the spring end portion and operatively connected device;

a yieldable and axially extendable connector between the arm and the input control of the proportioning valve to progressively apply increased forces on the input control as the yieldable connector is extended corresponding to increased vehicle loading.

3. In a vehicle with a selective brake fluid pressure generator for front and rear wheel brake components and a rear suspension system between sprung and unsprung portions of the vehicle including a longitudinally extending leaf spring having an end portion formed into a substantially closed loop through which a supporting fastener extends to pivotally mount the spring to the sprung vehicle portion so that when the loading in the rear portion of the vehicle is changed, the looped end portion rotates about the fastener, an input force responsive brake fluid pressure proportioning means to direct increased brake fluid pressure and braking capacity to the rear wheel brakes from the pressure generator as the vehicle load increases, and an improved load sensor to control the proportioning means comprising:

the proportioning valve having fluid inlet means extending from the pressure generator and fluid outlet means extending to the rear brakes and being mounted ahead of the looped end portion of the spring;

a force input control means of the proportioning valve to transmit increased pressure from the pressure generator to the outlet means as the force input to the control means increases;

a position following means adjacent to and operably connected to the looped end portion of the spring for movement therewith as the vehicle load changes, the position follower having an arm portion projecting substantially normal to the common axis of rotation of the position follower and looped end of the spring;

an axially extendable and yieldable connector extending between the force input control means and the arm of the position follower to apply a progressively increased force on the valve control means as increased loading of the leaf spring pivots the spring's end portion and the connected position follower to thereby axially extend the yieldable connector and resultantly increase the force applied to the control of the proportioning valve.

4. In a vehicle having a selective brake fluid pressure generator for front and rear brake components and a rear suspension system between sprung and unsprung portions of the vehicle including a longitudinally extending leaf spring with a forward end portion curved into a substantially closed loop through which a support fastener extends for pivotally mounting the spring to the sprung portion of the vehicle so that when the loading in the rear portion of the vehicle changes, the looped end portion rotates about the fastener, an input force responsive brake proportioning means for regulating the level of brake fluid pressure directed to the rear brakes from the pressure generator in response to movement of the looped end portion of the spring, comprising:

a proportioning valve mounted ahead of the looped end portion of the spring and having fluid inlet means connected to the selective fluid pressure generator and fluid outlet means connected to the rear brakes;

the proportioning valve having a force input control means for regulating brake inlet pressures thereto and transmitting regulated pressure to the outlet means whereby an increased input force to the proportioning valve produces an increased outlet pressure;

a bushing means with a generally tubular outer housing so configured to fit within the looped end portion of the spring and with a central cylindrical sleeve means for operably engaging the spring support fastener;

the tubular housing having a plurality of tabs extending from one side surface which extend generally co-planar with the tubular outer surface in an initial pre-assembly condition;

a spring position following means having a central body portion adapted to extend adjacent the side of the bushing and configured with openings to receive the plurality of tabs whereas the tabs are folded normal to the outer surface of the bushing housing and in overlying relation to the follower's central body portion, thus securing the tubular housing and central body portion together;

the position following means further having an arm portion extending from the body portion in a direction substantially normal to the axis of the spring fastener;

an axially extendable and yieldable connector extending between the force input control of the proportioning valve and the arm portion of the position follower to produce a progressively increased force on the valve's input control means in response to increased loading of the vehicle whereby the end of the leaf spring pivots the bushing and connected position follower and whereby the connector is axially extended to exert a force on the proportioning valve.

* * * * *